Nov. 10, 1931.  A. H. BLOHM  1,831,762

VENTILATING SYSTEM FOR PROJECTORS

Original Filed April 2. 1927   3 Sheets-Sheet 1

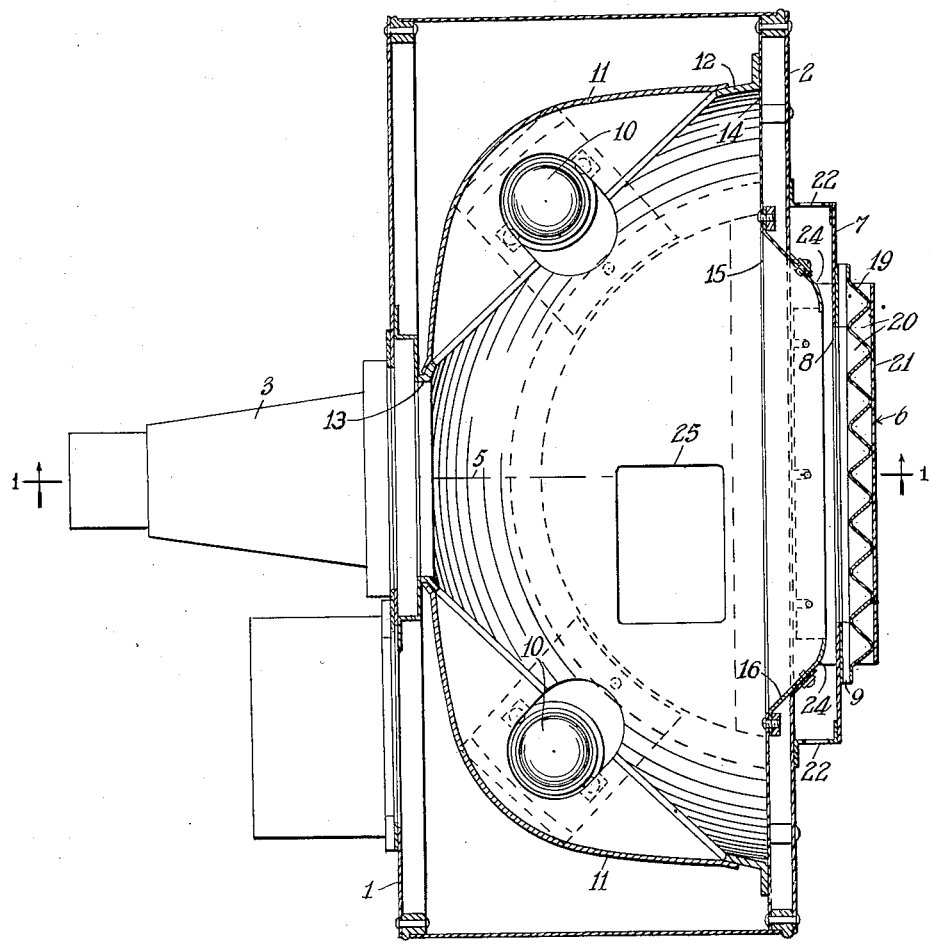

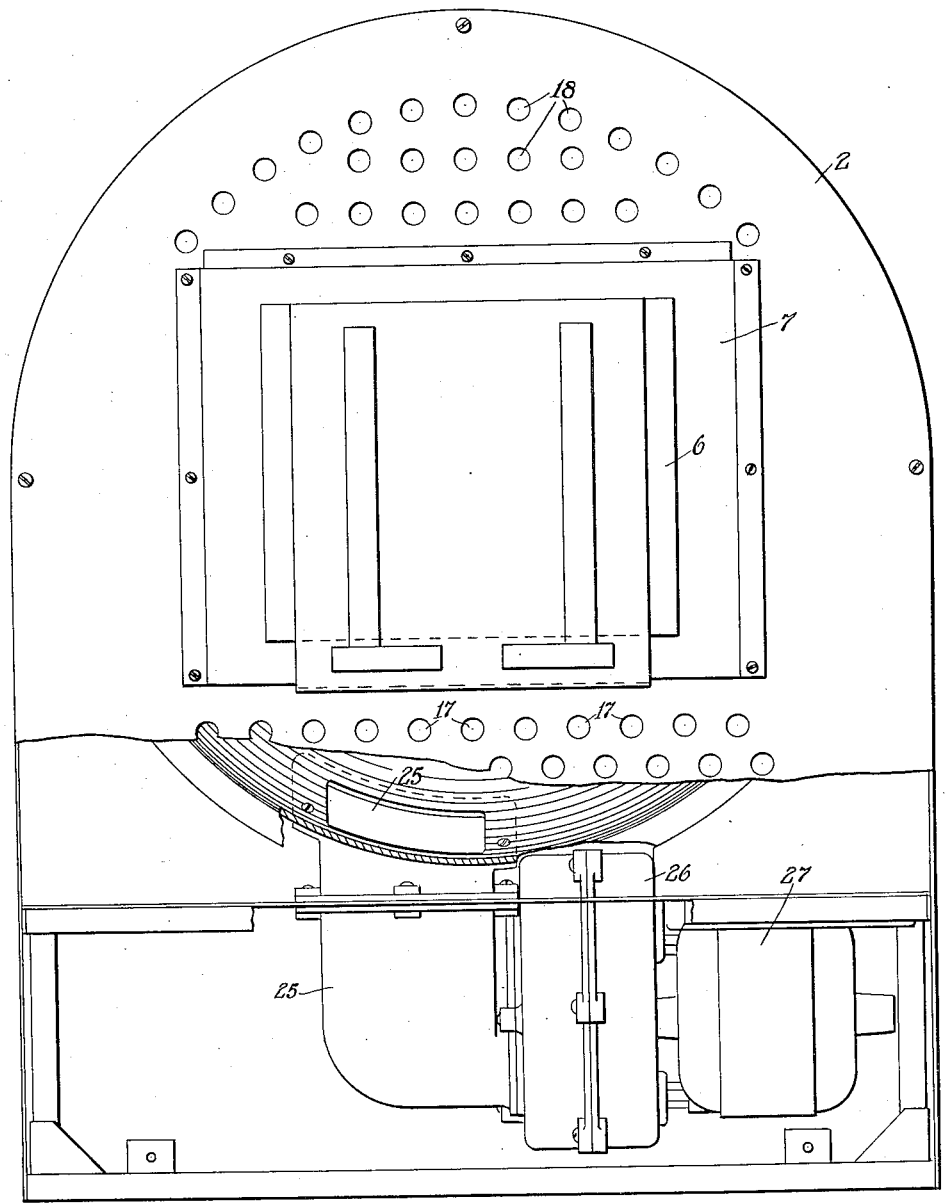

Patented Nov. 10, 1931

1,831,762

UNITED STATES PATENT OFFICE

AUGUST H. BLOHM, OF CHICAGO, ILLINOIS, ASSIGNOR TO TRANS-LUX DAYLIGHT PICTURE SCREEN CORPORATION, OF NEW YORK, N. Y., A CORPORATION OF DELAWARE

VENTILATING SYSTEM FOR PROJECTORS

Application filed April 2, 1927, Serial No. 180,414. Renewed February 17, 1931.

This invention relates to a projector and more particularly to a projector of the so-called opaque type, in which the object is opaque and the image thereof is projected upon a screen by means of reflected light.

In order to obtain sufficient light to successfully project the image of an opaque object upon a screen, the light must be so intense that a great deal of heat is generated and, therefore, an object being projected is often damaged by the heat. This fact is one of the principal reasons why the opaque type of projector has not gone into more extensive use.

Therefore it is the object of my invention to provide novel and improved means which shall effectively cool both the apparatus and the opaque object which is being projected thereby, so that an intense light may be employed.

The invention will be best understood from the following description when taken in connection with the accompanying drawings in which I have shown a selected embodiment of my invention, and in which:

Figure 2 is a horizontal sectional view through the projector of Figure 1, this section being taken on the line 2—2 of Figure 1.

Figure 3 is a rear elevation of the projector shown in Figures 1 and 2, part of the rear wall being broken away for purposes of illustration.

Figure 1:
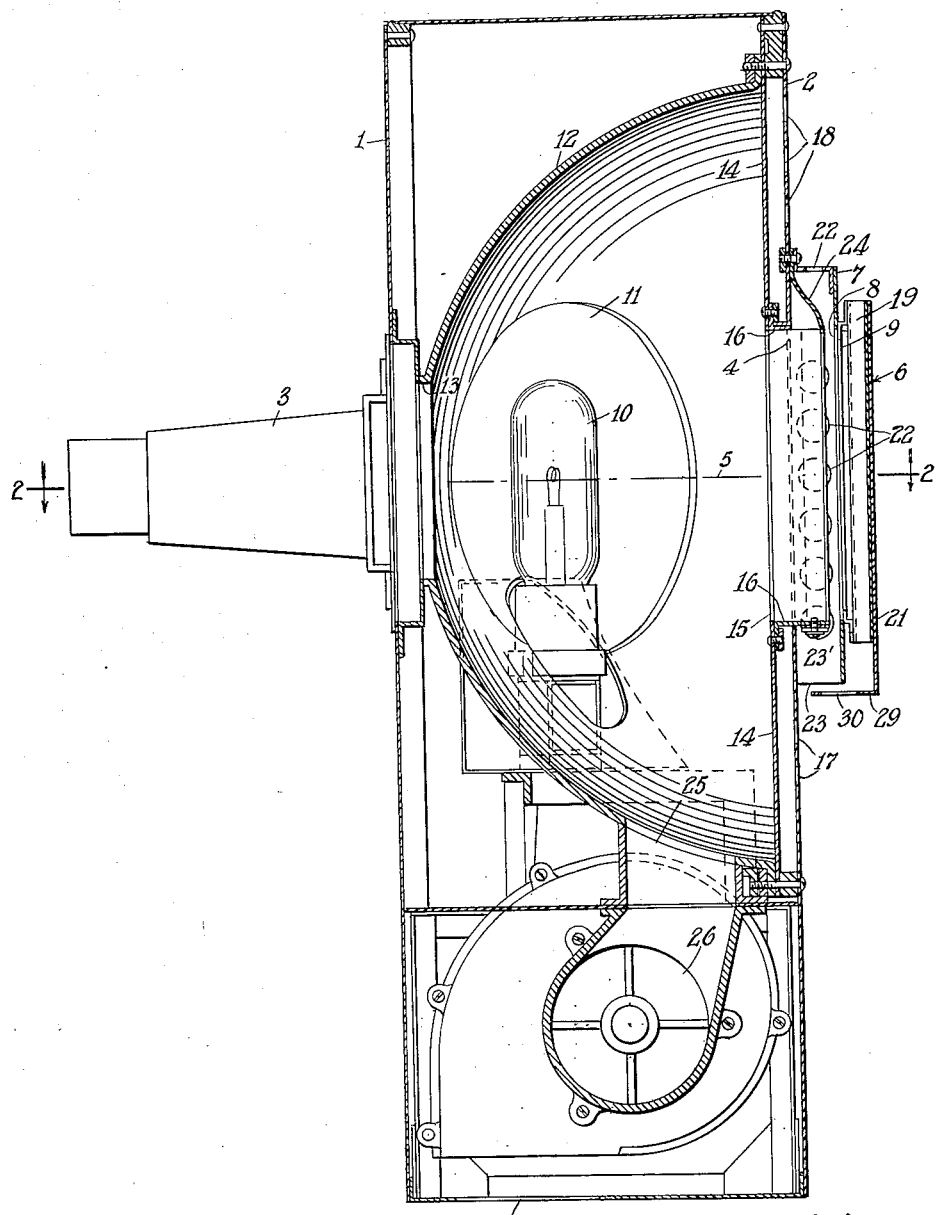
Figure 1 shows a vertical sectional view through a projector constructed according to my invention, this section being taken on the line 1—1 of Figure 2.

Referring now to the drawings, I have shown my invention as embodied in a casing having a front wall 1 and a rear wall 2. Disposed in the front wall is a suitable objective 3, and the rear wall is provided with an aperture 4 in the axis 5 of the objective. Also disposed in the axis 5 and in registry with the aperture 4 is an object holder 6. It will be seen that this holder is disposed rearwardly of the rear wall 2 and is supported upon a box 7. This box is provided with the aperture 8 registering with the aperture 4 so that the object indicated at 9 may be illuminated by any suitable source of light disposed within the casing. In the present embodiment, the light is furnished by two lamps 10 disposed upon opposite sides of the axis 5 and each supplied with an individual reflector 11. These reflectors are connected with a preferably spherical reflector 12 extending to the front wall 1 and having an opening 13 registering with the objective 3. The reflector 12 also extends rearwardly to the false back 14 so that the source of light will be completely enclosed except for the openings necessary for projection purposes.

The false back is spaced from the rear wall as shown so as to form an air space therebetween. The false back is, of course, provided with a suitable aperture 15 registering with the aperture 4, and the edges of these apertures are joined by a wall 16 so as to form a passage for the light and also to separate the air space between the rear wall and the false back from the interior of the casing. The rear wall is provided with a plurality of holes 17 disposed beneath the object holder and with a plurality of other holes 18 disposed above the object holder. By this means a natural draft of air is induced, this draft circulating through the air space between the rear wall and the false back, and it will be noted that this draft is confined entirely to the air space.

Disposed behind the object 9 is a member 19 which is preferably corrugated, as shown, so as to provide a plurality of vertical air passages 20 between the object and the plate 21 forming the back of the holder. It will be obvious that as the object in the holder is subjected to heat from the lamps an upward flow of air through the channels 20 will be caused, thus helping to cool the object and more particularly the back thereof.

To further cool the object and the apparatus itself, I provide the sides and top of the box 7 with a plurality of openings 22 through which air may be drawn. The bottom of the box preferably is left open as shown at 23. Extending inwardly from the top and sides of the box are plates 24 forming ogee curves and causing the air passing through openings 22 to strike the face of the object in a thin concentrated stream at increased velocity.

The air thus drawn in from all sides of the box will strike the face of the object in the holder and will then be drawn into the enclosure formed by the reflectors and the false back and then will be drawn out through the duct 25 by means of a suitable fan 26 operated by a motor 27, and discharged through the bottom of the casing at 28. The details of the fan form no part of this invention and, therefore, have not been shown.

The result of the above described arrangement is to provide a cooling current of air to pass over the back of the object, this current being mainly a natural one although assisted somewhat by the drawing in of air through the opening at the bottom 23 of the box. The current induced by the fan 26 strikes the face of the object, thus maintaining it cool, and then is drawn in through the passage formed by the wall 16 and out through the duct 25. This current will then first cool the object itself and then the apparatus.

The main source of supply of the air drawn in by the action of the fan is that passing through the openings 22 in the top of the box, because of the fact that these top openings are approximately in line with the duct 25. This supply of air is augmented by that coming in through the openings 22 in the sides of the box and the air admitted through the open bottom of the box at 23 will also pass through the passage and prevent the formation of a pocket of dead air adjacent the bottom of the passage, which pocket might be formed if the bottom of the box were closed. It will be noted that the air passing through the open bottom 23 will be throttled at 23′ and thus it also will enter the passage in a relatively thin stream so that the face of the object will be subjected to a thin stream of air from all sides.

A substantial amount of the heat generated by the lamps will strike the false back 14, which is separated from the rear wall by the air space. This air space is kept continuously cool by the natural draft passing in through the holes 17 and out through the holes 18. It will be noted that the draft is entirely independent of the forced draft caused by the fan. Therefore the object is maintained at a very low temperature even when intense lights are used to illuminate the object.

While I have referred to the object as being supported at 9, this position being suitable for a slide or the like, the holder is adapted to support other forms of objects such as books. For this purpose the holder is provided with a horizontally disposed flange 29, upon which a book may be supported and exposed at the aperture 4. This flange is provided with a plurality of holes 30 through which air may pass to help maintain the object cool.

For the purposes of illustration I have shown the invention as embodied in a form which has been found satisfactory in actual practice, but I realize that various changes will occur to those skilled in the art and I do not intend to limit myself except by the appended claims.

I claim:

1. A projector comprising a casing having front and rear walls, an objective disposed in said front wall, an object holder disposed rearwardly of said rear wall and in the axis of said objective, said rear wall having an aperture registering with said object holder, a source of light disposed between said walls and adapted to illuminate an object in said holder, an inclosure for said source, means causing a forced draft to ventilate said inclosure, means causing a natural draft to cool said rear wall, and means to induce a flow of air across the back of the object in said object holder.

2. A projector comprising a casing having a wall, an objective disposed in front of said wall, an object holder disposed rearwardly of said wall and in the axis of said objective, said wall having an aperture registering with said object holder, a source of light disposed in front of said wall and adapted to illuminate an object in said holder, an inclosure for said source, means causing a forced draft to ventilate said inclosure, means causing a natural draft to cool said wall, and means to draw air across the face of said object from all sides.

3. A projector comprising a casing having a wall, an objective disposed in front of said wall, an object holder disposed rearwardly of said wall and in the axis of said objective. said wall having an aperture registering with said object holder, a source of light disposed in front of said wall and adapted to illuminate an object in said holder, means causing a forced draft to cool said source, means causing a natural draft to cool said wall, means to draw air across the face of an object in said object holder, and means to cause said air to travel across said face at a velocity greater than it travels prior to passing over said face.

4. A projector comprising a casing having front and rear walls, an objective in said front wall, an object holder disposed rearwardly of said rear wall and in the axis of said objective, said rear wall having an aperture registering with said object holder, a false back spaced forwardly of said rear wall and having an aperture registering with said first named aperture, a source of light disposed between said walls and adapted to illuminate an object in said holder, a reflector extending from said objective to said false back and surrounding said source to complete an inclosure therefor, a wall forming a passage through said apertures, a fan in said casing and adapted to draw air through said passage into said inclosure and then out therefrom, and said rear wall having holes disposed above and below said passage to cause a circulation of air between said rear wall and said false back.

5. A projector having a wall with an aperture therein, an object holder supported rearwardly of said wall, a source of light disposed in front of said wall and adapted to illuminate the face of an object in said holder, means to draw air across the face of said object, and means to cause said air to travel across said face at a velocity greater than that at which it travels prior to passing over said face.

6. A projector having a wall with an aperture therein, an object holder supported rearwardly of said wall, a source of light disposed in front of said wall and adapted to illuminate the face of an object in said holder, means to draw air across the face of said object, means to induce a flow of air across the back thereof, and independent means to cool said wall.

7. A projector comprising a casing having a rear wall with an aperture therein, an object holder supported rearwardly of said rear wall, a source of light disposed in said casing and adapted to illuminate an object in said holder, means to draw air across the face of said object and through said aperture into said casing, means to induce a flow of air across the back thereof, and independent means to cool said wall.

8. A projector comprising a wall having an aperture therein, means to dispose an object adjacent said aperture, a source of light to illuminate said object, means to cool the back of said object, and independent means to cool said wall adjacent said aperture.

9. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, and means terminating said air space adjacent said aperture.

10. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, and a wall closing said air space adjacent said aperture.

11. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, a wall closing said air space adjacent said aperture, and means causing a current of air to flow through said space and around said aperture wall.

12. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, a wall closing said air space adjacent said aperture, and holes above and below said aperture to cause a natural draft to flow through said space.

13. A projector comprising an object holder, a box supporting said holder and having an aperture adapted to register with an object in said holder, one or more of the sides of said box having openings therein, and plates disposed inside of said box adjacent said openings to deflect air entering said openings against the face of said object.

14. A projector having a wall with an aperture therein, an object holder supported on one side of said wall and registering with said aperture, a source of light disposed on the other side of said wall and adapted to illuminate said object through aperture, a false back spaced from said wall to form an air space between said wall and said source, and a wall between said first mentioned wall and said false back closing said air space adjacent said aperture.

15. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, a wall between said first mentioned wall and said false back closing said air space adjacent said aperture, and means causing a current of air to flow through said space and around said aperture wall.

16. A projector having a wall with an aperture therein, an object holder supported on one side of said wall and registering with said aperture, a source of light disposed on the other side of said wall and adapted to illuminate said object through said aperture, a false back spaced from said wall to form an air space between said wall and said source, a wall between said first mentioned wall and said false back closing said air space adjacent said aperture, and holes above and below said aperture to cause a natural draft to flow through said space.

17. A projector comprising a casing, an object holder, a box supporting said holder and having an aperture adapted to register with an object in said holder, one or more sides of said box having openings therein, plates disposed inside of said box adjacent said openings to deflect air entering said openings against the face of said object, and means to draw air through said openings into said casing.

In testimony whereof, I have affixed my signature to this specification.

AUGUST H. BLOHM.